US011423781B2

(12) United States Patent
Banome et al.

(10) Patent No.: US 11,423,781 B2
(45) Date of Patent: Aug. 23, 2022

(54) SYSTEM AND METHOD FOR FACILITATING COORDINATED, EFFICIENT RESPONSE TO FIRE EMERGENCY

(71) Applicant: Rapid Response Co., Staten Island, NY (US)

(72) Inventors: Robert Banome, Staten Island, NY (US); Robert LaRocca, Staten Island, NY (US)

(73) Assignee: Rapid Response, Co. a Del Corporation, Staten Island, NY (US)

( * ) Notice: Subject to any disclaimer, the term of this patent is extended or adjusted under 35 U.S.C. 154(b) by 338 days.

(21) Appl. No.: 16/589,316

(22) Filed: Oct. 1, 2019

(65) Prior Publication Data

US 2021/0097860 A1    Apr. 1, 2021

(51) Int. Cl.
*G08G 1/0968* (2006.01)
*G06Q 50/26* (2012.01)
*G08G 1/0965* (2006.01)
*G06F 3/0482* (2013.01)

(52) U.S. Cl.
CPC ....... *G08G 1/096844* (2013.01); *G06Q 50/26* (2013.01); *G08G 1/0965* (2013.01); *G06F 3/0482* (2013.01)

(58) Field of Classification Search
CPC .......... G08G 1/096844; G08G 1/0965; G06Q 50/26; G06F 3/0482
See application file for complete search history.

(56) References Cited

U.S. PATENT DOCUMENTS

| | | | |
|---|---|---|---|
| 6,904,361 B1 | 6/2005 | Tallman et al. | |
| 7,269,801 B2 | 9/2007 | Kyle | |
| 8,571,722 B2 | 10/2013 | Samples et al. | |
| 9,217,242 B1* | 12/2015 | Jones | E03B 9/04 |
| 9,300,799 B2 | 3/2016 | Brown et al. | |
| 9,666,042 B2* | 5/2017 | Wedig | G08B 21/22 |
| 9,824,463 B2 | 11/2017 | Ingrassia et al. | |
| 11,043,095 B1* | 6/2021 | Derickson | G08B 7/066 |
| 2005/0164673 A1* | 7/2005 | Ehlers | G08G 1/096811 455/404.1 |
| 2007/0103341 A1* | 5/2007 | Kreiner | G08G 1/202 340/988 |
| 2009/0138353 A1* | 5/2009 | Mendelson | G01S 5/02 705/14.39 |
| 2013/0147604 A1* | 6/2013 | Jones, Jr. | G08B 7/066 340/6.1 |
| 2016/0100302 A1* | 4/2016 | Barash | G16H 40/20 455/404.2 |
| 2016/0148490 A1 | 5/2016 | Barnes | |
| 2017/0277671 A1 | 9/2017 | Duggan et al. | |
| 2018/0054490 A1* | 2/2018 | Wadhwa | G08G 1/0116 |

* cited by examiner

*Primary Examiner* — Mohamed Barakat
(74) *Attorney, Agent, or Firm* — Jack Baldini, Esq.

(57) ABSTRACT

A mapping and coordinated communication system that allows emergency first responders and fire fighting vehicles to have advance and continuing real-time information regarding fire hydrant location and status as well as scene information to facilitate and provide automated feedback of which vehicles, arriving in which order, should hook up to which hydrants, to provide the most efficient directions to arrive at those exact locations, for the most likely effective fire fighting outcome.

4 Claims, 9 Drawing Sheets

FIG. 8

SYSTEM AND METHOD FOR FACILITATING COORDINATED, EFFICIENT RESPONSE TO FIRE EMERGENCY

FIELD OF THE INVENTION

A mapping and coordinated communication system that allows emergency first responders and fire fighting vehicles to have advance and continuing real-time information regarding fire hydrant location and status as well as scene information to facilitate and provide automated feedback of which vehicles, arriving in which order, should hook up to which hydrants, to provide the most efficient directions to arrive at those exact locations, for the most likely effective fire fighting outcome.

BACKGROUND

The difference between a good outcome and a great outcome with respect to containing a residential fire outbreak can literally be seconds. This can be the difference between life and death. Advances are continually being made in providing our first responders with the newest and best in fire fighting equipment. Fire response vehicles are always at the ready with brave men and women ready to leap at the sound of an alarm. They don their protective gear, assemble at their positions and off they go to face whatever might lie ahead to do their best at assessment, rescue, containment and ultimately providing the best outcome possible to minimize death, damage and destruction.

Typically, when an alarm sounds, the first responders already have a map and know the street locations, cross roads, one-ways, traffic lights, traffic patterns and coordinates of all near fire hydrants. But, in addition to all other obvious obstacles and the desire to be fast, added to the hectic, frantic myriad tasks required to get on location and set-up, are the most important decisions affecting an efficient response—what is the best fire hydrant for this vehicle to hook up to and what is the most efficient route for that vehicle to take in order to be in position to hook up to that hydrant. The complexity of these decisions are affected by many factors, such as, are we the first to arrive, or second, or third or more? Is an expected fire hydrant not visible for some reason such as being covered with garbage bags, snow or an illegally parked car? Will we be wasting time connecting to a particular hydrant because it is currently not functioning? Which side of the street, depending on from which direction we're approaching, will any particular hydrant be? Will building numbers be clearly marked? Is another arriving vehicle, even though arriving seconds later, the better vehicle to hook up to a particular hydrant, and that first vehicle better directed to a nearby alternative hydrant? As a result, these threshold decisions impact the effectiveness of any response.

There have been attempts at providing first responders with access to important information to lessen the burdens of these decisions. For example, in Publication No. US 2016/0148490 A1, entitled, "Rapid Response with Direct Connect for Emergency Responders", it is disclosed, "a smart phone app system for use by emergency responders, includes a server for processing and sending an alert signal indicating details of an emergency event to be displayed on an emergency responder's smart phone or other device and displaying input buttons for allowing the emergency responder to provide a response signal indicating that they are responding or they are not responding by touching one of the input buttons. A map to the station or emergency site can be automatically displayed on the emergency responder's smart phone or other device and a list of other responders can be displayed with direct text or other communication being available to the other responders with a simple press of a button. The app system greatly improves the response time and efficiency for responding to an emergency event." While we applaud the desire here to increase communication efficiency between emergency responders, a shortfall here is that communication between responders is still required. Responders still have complex and time sensitive decisions critical to the outcome to make.

In another example, Publication No. US 2017/0277671 A1, entitled, "Map Notes", discloses, "a computing device includes a display, a logic machine, and a storage machine holding instructions executable to display a map via the display, and associate a note with location data defining a geographic location. The note is associated with an annotation displayable on the map. The annotation is associated with a location parameter defining a map location at which the annotation is displayed on the map corresponding to the geographic location associated with the note. The annotation is associated with a zoom parameter defining one or more neap zoom levels at which the annotation is displayed on the map. The annotation is associated with a context parameter defining one or more computing device contexts with which the annotation is displayed on the map. A notification corresponding to the note is presented based on the computing device being located within a threshold distance of the geographic location." Additionally, this reference specifically references that "a user may associate a note with the location of a fire hydrant and the map annotation interface may provide the user with information indicating the user's distance from the fire hydrant, along with an arrow pointing toward the fire hydrant." However, this still leaves much in the hands of the user and imparts nothing towards the real-time status of any particular fire hydrant.

In another example, U.S. Pat. No. 6,904,361 B1, entitled, "Municipal Utility Mapping System and Method", it is disclosed, a "computer system and method provides a community map of a plurality of types of utility resources. Software displays a graphic map with visual references to a plurality of types of utility resources. The software also includes instructions that associate data relating to instances of the utility resources and display the data on the display. The method of creating a community map of a plurality of types of utility resources involves associating a plurality of maps of utility resources into a single graphic representation, associating related data with each utility resource; and providing a link between positions on the graphic representation and the associated data that enables display of the associated data when a position on the graphic representation corresponding to a utility resource is activated."

In another example, U.S. Pat. No. 7,269,801 B2, entitled, "System for Managing the Navigational Usability of an Interactive Map", discloses, "a graphical user interface for graphically managing the navigational usability of an interactive map is described. In one embodiment, the graphical user interface includes a layer hierarchy having a first layer and a second layer. The graphical user interface also includes a first display range bar associated with the first layer and configured to show a range of map scales at which the first layer is displayed in the digitized map. In addition, the graphical user interface includes a second display range bar associated with the second layer and configured to show a range of map scales at which the second layer is displayed in the digitized map." Finally, in another example, U.S. Pat. No. 9,824,463 B2, entitled, "Methods and Systems for Providing Mapping, Data Management, and Analysis, discloses, "a method for providing mapping, data management and analysis. Creation of a map is initiated with a desired Gaussian aggregation and desired color map parameters. Data is loaded to be utilized in the map. The data is rasterized, then converted to a certain scale. A convolution operation is performed on the data. The convolution results are applied to a color ramp, and the map is created based on the color ramp and the convolution results."

In all of these examples, there is data aggregation, there is data analysis, there is some type of mapping function, all to provide the user with greater knowledge for the user to make decisions. But the user remains in control and must make decisions. In some instances, the ultimate decision may be easier to make, but referencing and digesting the provided information in and of itself can utilize precious seconds in an emergency situation and distract the decision maker from accomplishing other important tasks. Some of the references provide for increased communication ability between various members of a response force. But this then requires that the various members must take the time to actually communicate. This again requires valuable seconds.

Here, the disclosure overcomes these and other limitations of the prior art. The decisional process and necessity for digesting information for the purpose of decision making and the necessity for intra-responder communication is taken out of the hands of the responders, allowing them to focus solely on the task at hand. The responder utilizing the system of the present disclosure is told what fire hydrant to go to and what the best route to get there is, not merely provided with information to decide for themselves those two things. The responder is provided with additional information to insure that they will be facilitated in accomplishing their goals.

The foregoing has several advantages over the prior art. Precious seconds are saved meaning the difference between life and death and between minimal damage and devastating damage. Human error is removed. Automatic coordination between multiple arriving responders is achieved so that each responding vehicle (taking into account the capabilities of each such vehicle and capacities and status of the applicable hydrants) is directed to the appropriate hydrant in the most efficient manner—they will never be in each other's way. In some instances where a responder will be faced with an unnaturally hidden hydrant, additional information is readily available so that the responder is not wasting valuable seconds in locating the hydrant they are to hook up to. And, when a responder does hook up to a hydrant (even one that they were told not to hook to), the system processes that information and coordinates with all other responders so there is never a mis-direction to a taken hydrant.

Alternatively, a responder may attempt a hydrant hook-up and find the hydrant inoperative for some reason. In that situation, the system would process that information and coordinate with all other responders so there is never a mis-direction to an inoperative hydrant. Additionally, in that situation, the hydrant would be flagged for service and not placed back in active status until such service has been performed and confirmed.

There are many other key features of the mapping and coordinated communication system disclosed herein, all as more specifically detailed below, all of which provide the goal of shorter, more efficient and coordinated response times, eliminating human error, eliminating some chaos from a chaotic environment, and ultimately preserving more homes and saving more lives.

In one embodiment, the mapping and coordinated communication system disclosed herein takes information currently maintained but not made readily available and, not only make it available to those with the most need, but use that information to provide those with that need with specific instructions to follow and reducing assessment time as the system is assessing information heretofore not begun to be assessed until arrival on the scene.

None of the foregoing references or other known prior art, alone or in combination, teach the salient and proprietary features of the present disclosure as just described. While there are many 'new technology' mapping systems and information aggregators, none, alone or in combination disclose this pre-emptive assessment of information to provide first responders with the assessment plan and specific coordinated directions for each response vehicle to hook up to which hydrants in response to an event, update that plan in real-time based on unforeseen circumstances, taking out of the hands of the responders the need for on-site assessment wasting precious time.

SUMMARY

The present disclosure teaches embodiments of a mapping and coordinated communication system that maps all known fire hydrant locations within a given response area and is updated regularly and/or continuously with the status of each such hydrant. For example, at each inspection, information is inputted so that the system has the most up-to-date information available about the hydrant, including but not limited to, location, appearance of surrounding area, water flow, distances from various target points, and the like. In one embodiment, the hydrant may be equipped with a sensor linked to the system to provide additional information, including but not limited to, is the current water pressure in the hydrant what would be expected of a functional hydrant; is a vehicle currently parked illegally in front; is the hydrant obstructed by garbage or snow; and the like. In one embodiment, the system is then automatically provided with a location of an event as an incoming alarm is provided. In one embodiment, the system then computes the location of the event and each nearest hydrant and its status and each nearest station with a response vehicle (or vehicles) ready to respond and the capabilities of each such vehicle. In one embodiment, the best plan is then computed for which response vehicle should arrive, from which response station, and hook up to which hydrant based on each such vehicle's capabilities and anticipated arrival time based on all known factors and exact directions are provided individually to each such response vehicle coordinating each to arrive efficiently from the best approach without getting in each other's way (and leaving sufficient resources available for potential other calls). In this way, first responders and fire fighting vehicles are provided with immediate and continuing real-time information regarding fire hydrant location and status to facilitate and provide the best likely outcome for which vehicles, arriving in which order, should hook up to which hydrants, and providing the most efficient directions to arrive at those exact locations, for the most effective fire fighting outcome.

In one embodiment, the mapping and coordinated communication system is further configured to allow a user to input information that may affect the overall efficiency of a fire-fighting effort. For example, "we just suffered a mechanical issue that will delay our arrival"—the system could then update and re-route as appropriate, all other responders. Or, in another example, a response vehicle may get into an accident or otherwise get delayed on the way to a response location. A user, in real-time, may input this circumstance and the system can immediately re-coordinate with the other arriving vehicles to make the best use of available resources, and may then direct an additional response vehicle for backup. In another example, the first arriving responder may assess the fire and report that it is actually larger (or smaller) than as first reported and there is a need for more (or less) responders and the first responder, in real-time, may input this circumstance and the system can immediately re-coordinate with the other arriving vehicles to make the best use of available resources (summon for others or direct arriving vehicles to turn back, as appropriate).

BRIEF DESCRIPTION OF THE DRAWINGS

Figure 8:
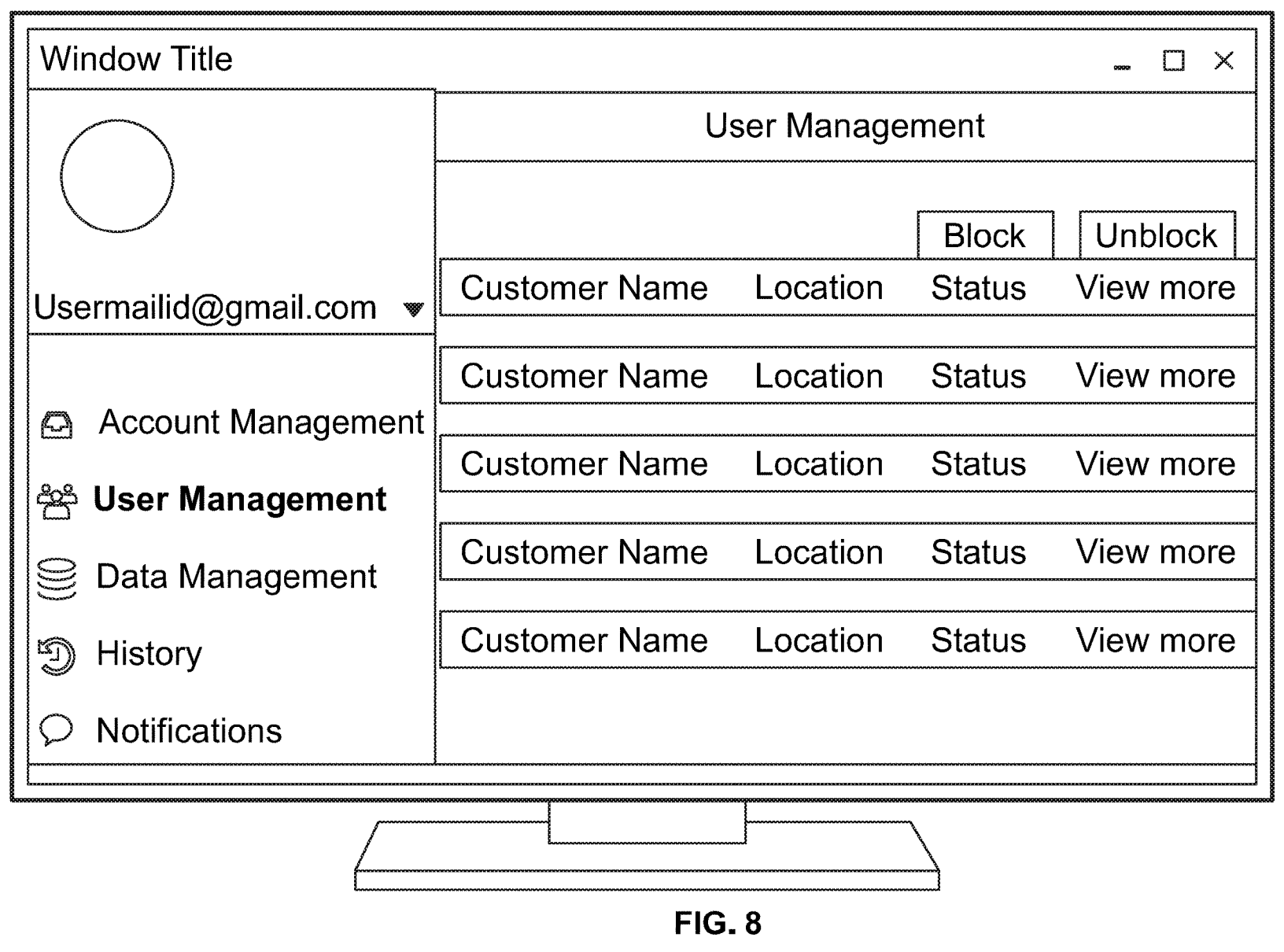

FIG. 8 depicts one embodiment of the mapping and coordinated communication system disclosed herein illustrating one potential screenshot of a computer based program as enabled, namely, one embodiment of a user management screen where a user would enable and/or disable specific account or sub-account users and/or access other features.

DETAILED DESCRIPTION

Figure 1:
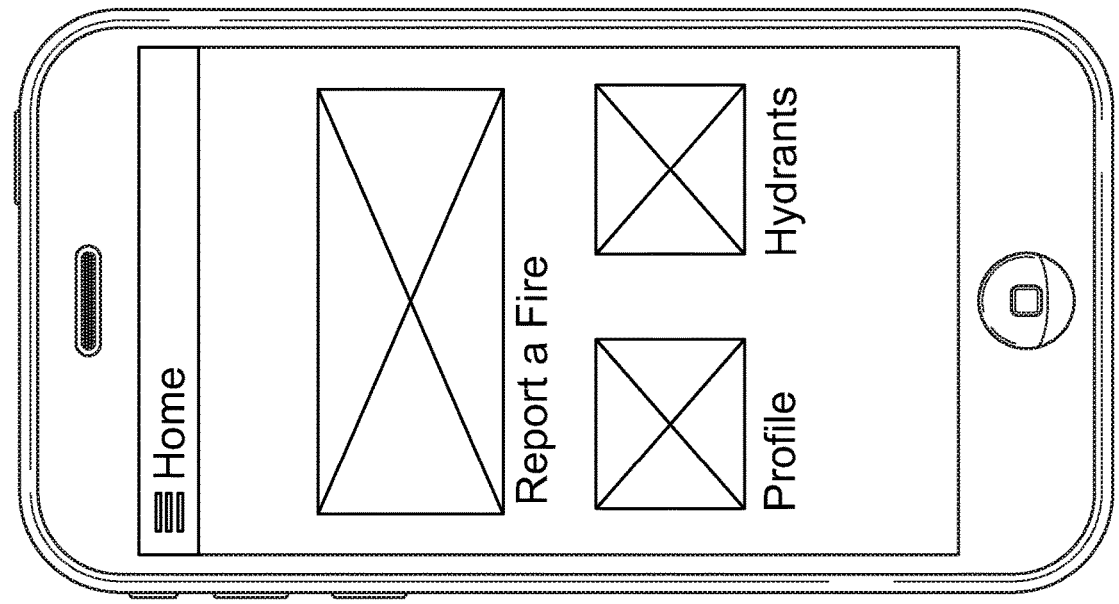
FIG. 1 depicts one embodiment of the mapping and coordinated communication system disclosed herein illustrating two potential screenshots of an app as enabled in two different modes, namely, one embodiment of a log in screen where a user would enable access and one embodiment of a home screen where a user would access various features.
Figure 1:
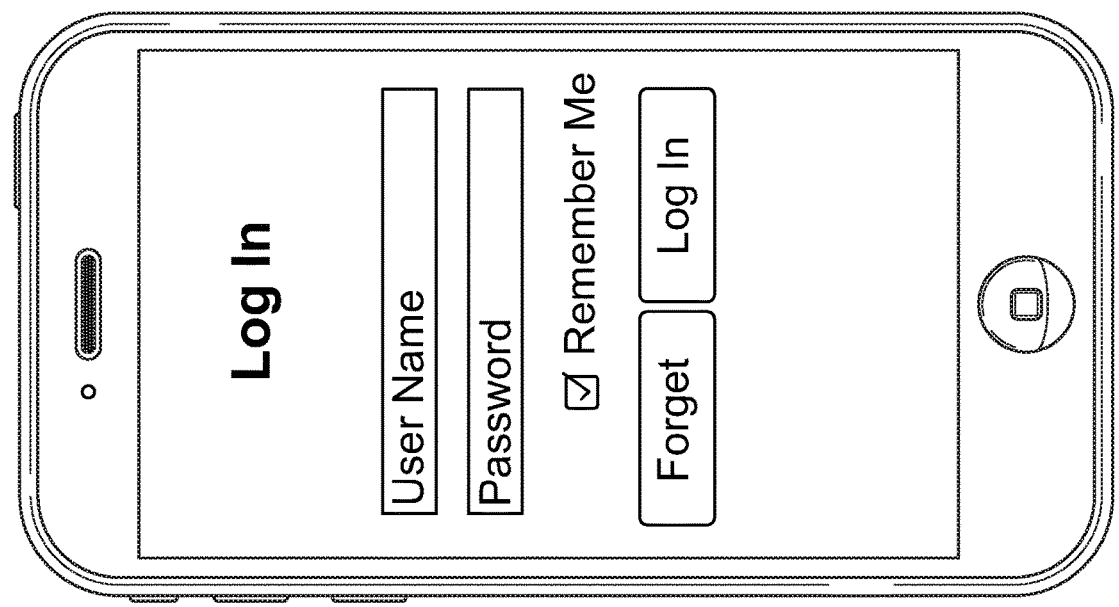
Figure 2:
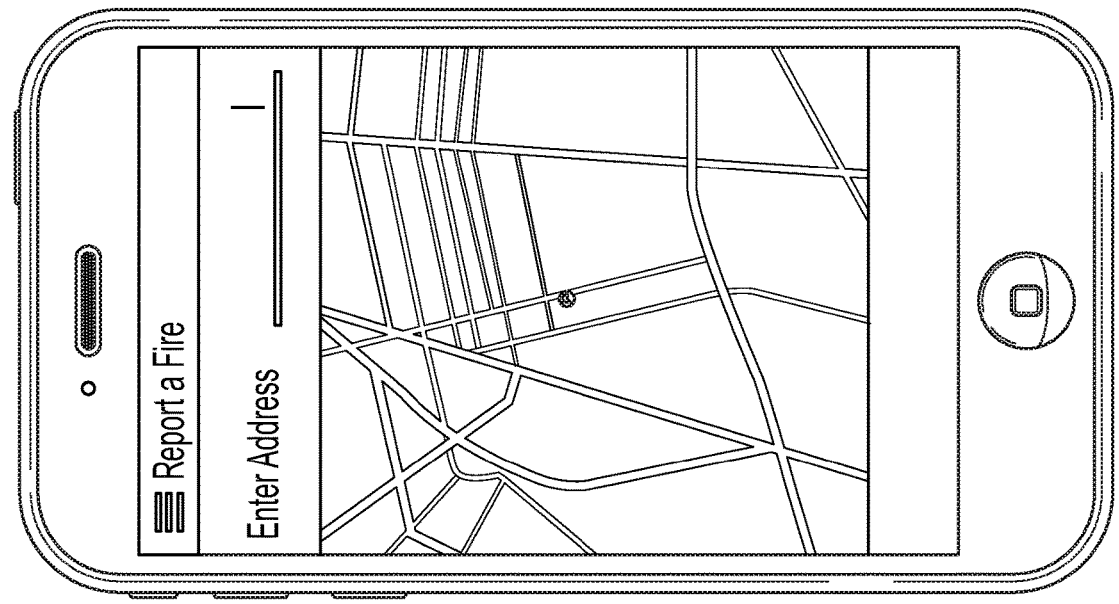
FIG. 2 depicts an embodiment of the mapping and coordinated communication system disclosed herein illustrating two potential screenshots of an app as enabled in two different modes, namely, one embodiment of a settings screen where a user would update various bits of information about themselves, hydrants and other features and one embodiment of a screen where a user could report an event.
Figure 2:
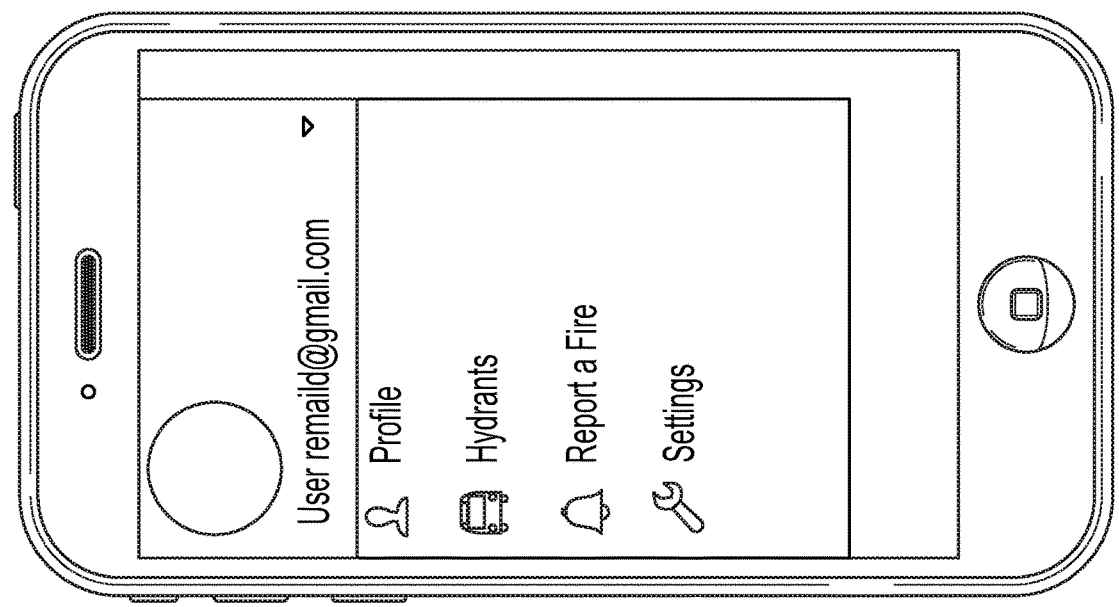
Figure 3:
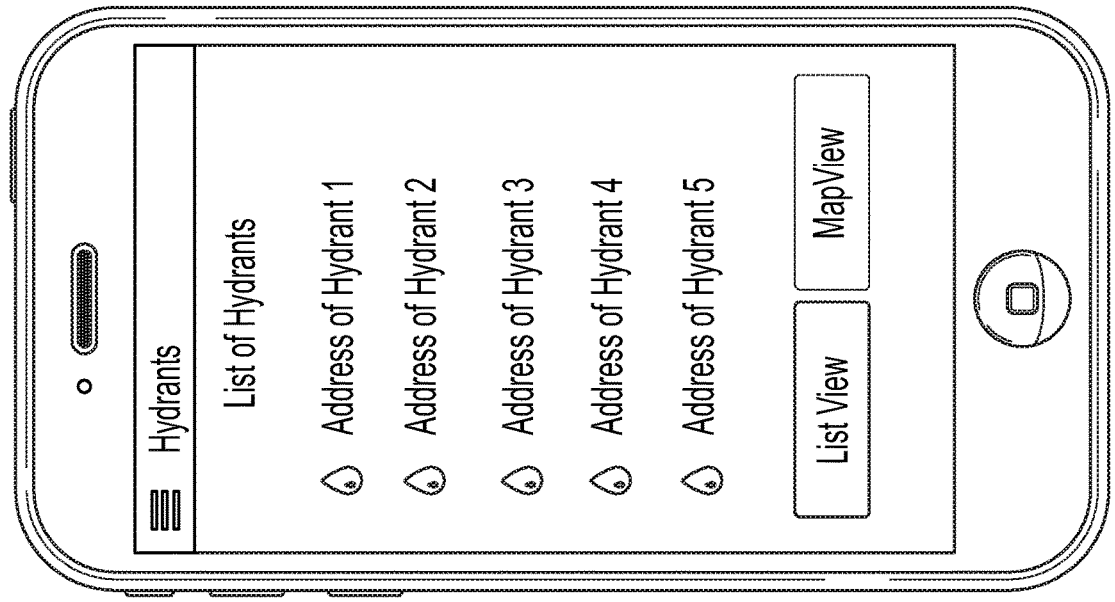
FIG. 3 depicts one embodiment of the mapping and coordinated communication system disclosed herein illustrating two potential screenshots of an app as enabled in two different modes, namely, one embodiment of a screen where a user would be provided directions to an event and a specific hydrant and one embodiment of a screen where a user would be provided information about all available hydrants appropriate to an event.
Figure 3:
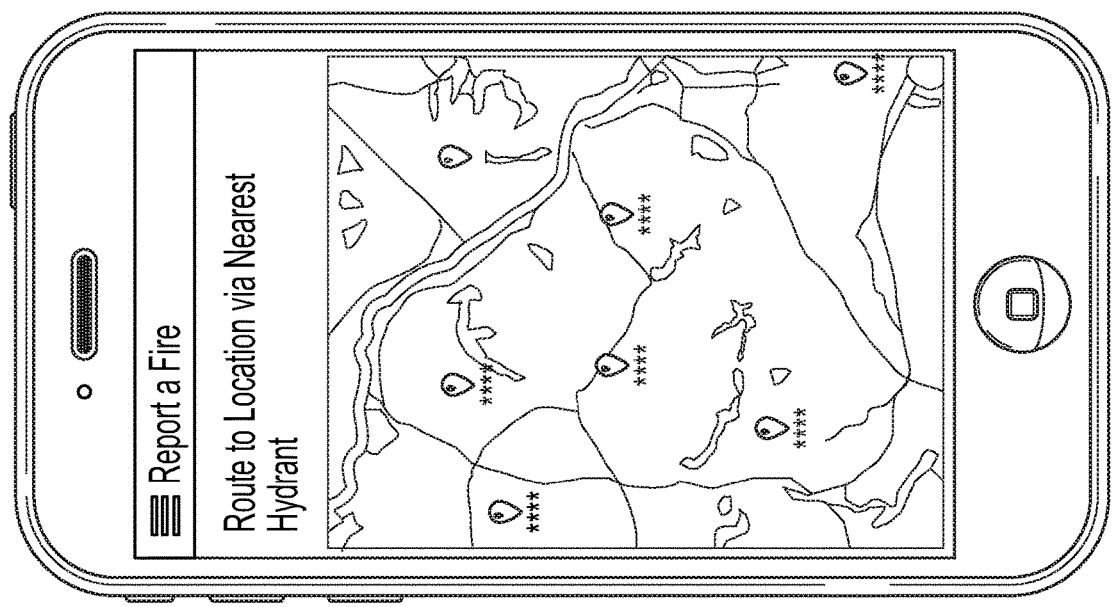
Figure 4:
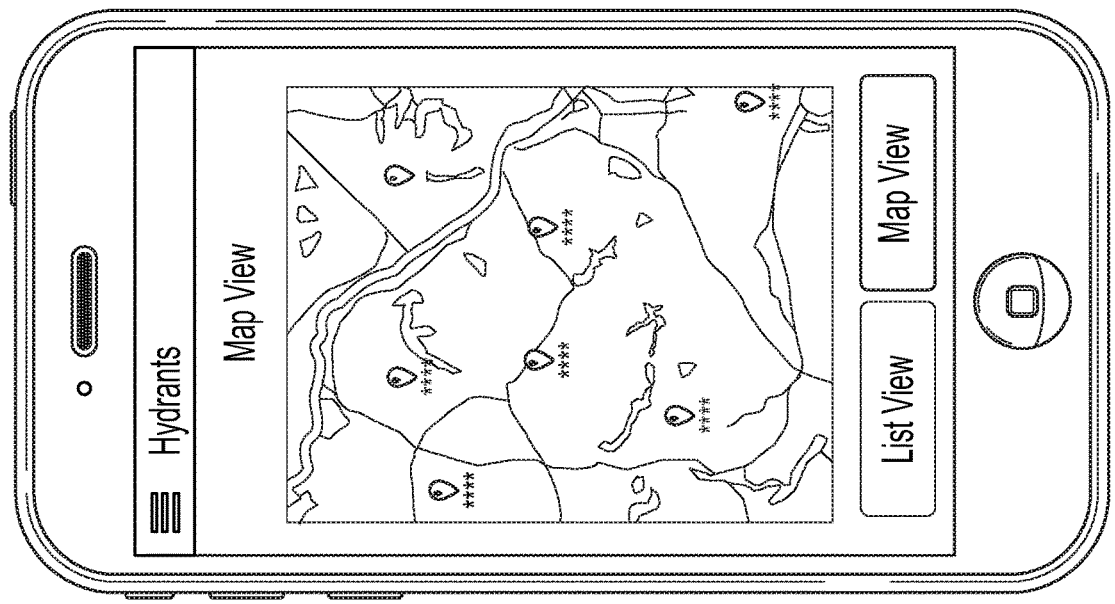
FIG. 4 depicts one embodiment of the mapping and coordinated communication system disclosed herein illustrating one potential screenshot of an app as enabled, namely, one embodiment of a map view screen regarding information about all available hydrants appropriate to an event.
Figure 5:
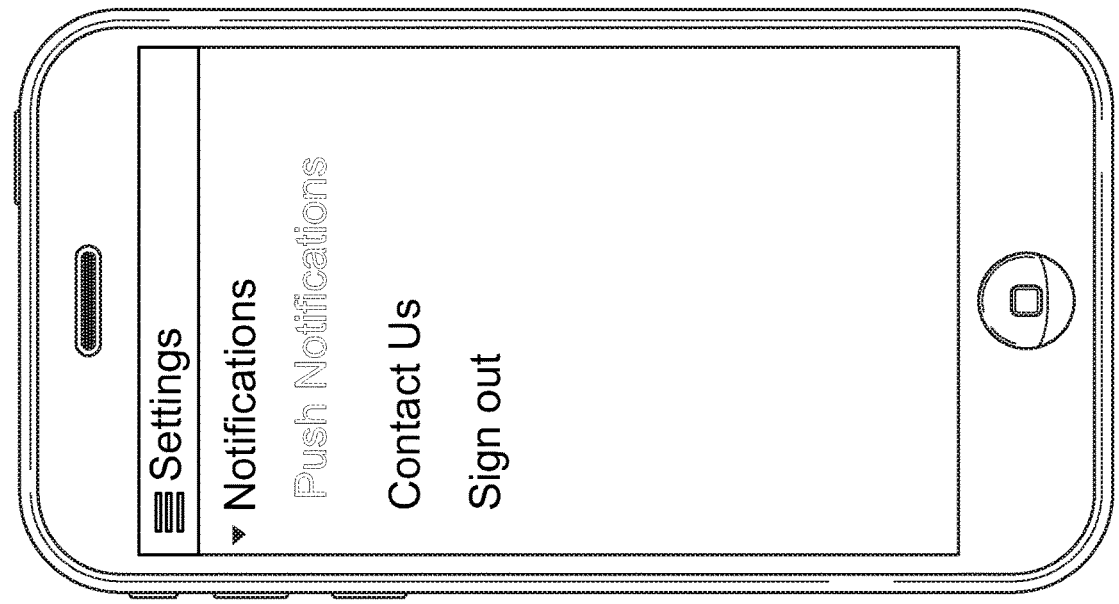
FIG. 5 depicts one embodiment of the mapping and coordinated communication system disclosed herein illustrating two potential screenshots of an app as enabled in two different modes, namely, one embodiment of a user profile screen where a user would update information about themselves and/or their account and one embodiment of a settings screen where a user could update various information and/or other features.
Figure 5:
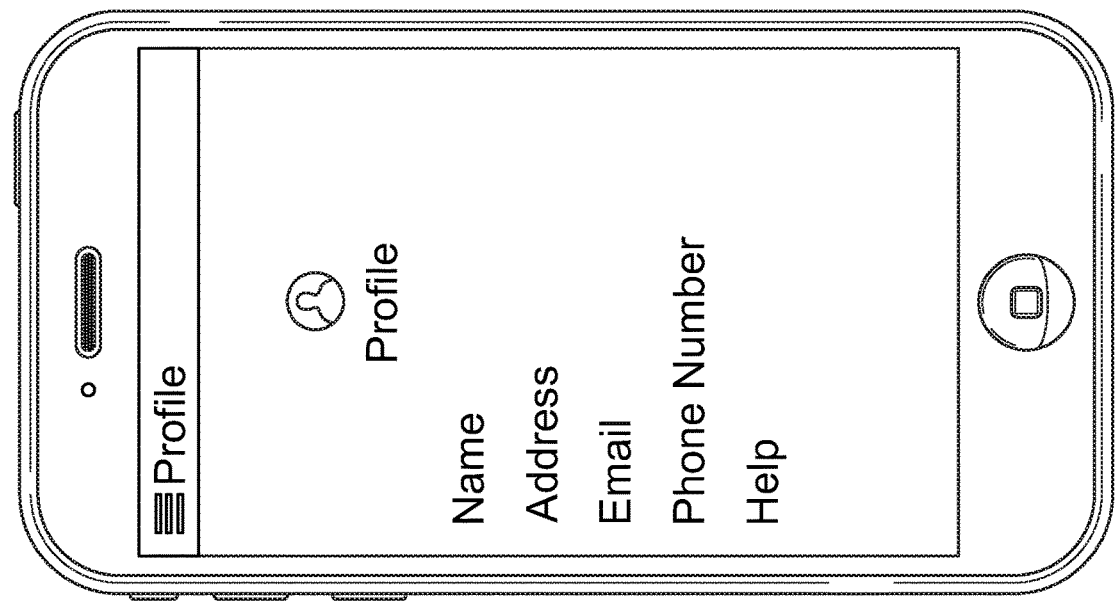
Figure 6:
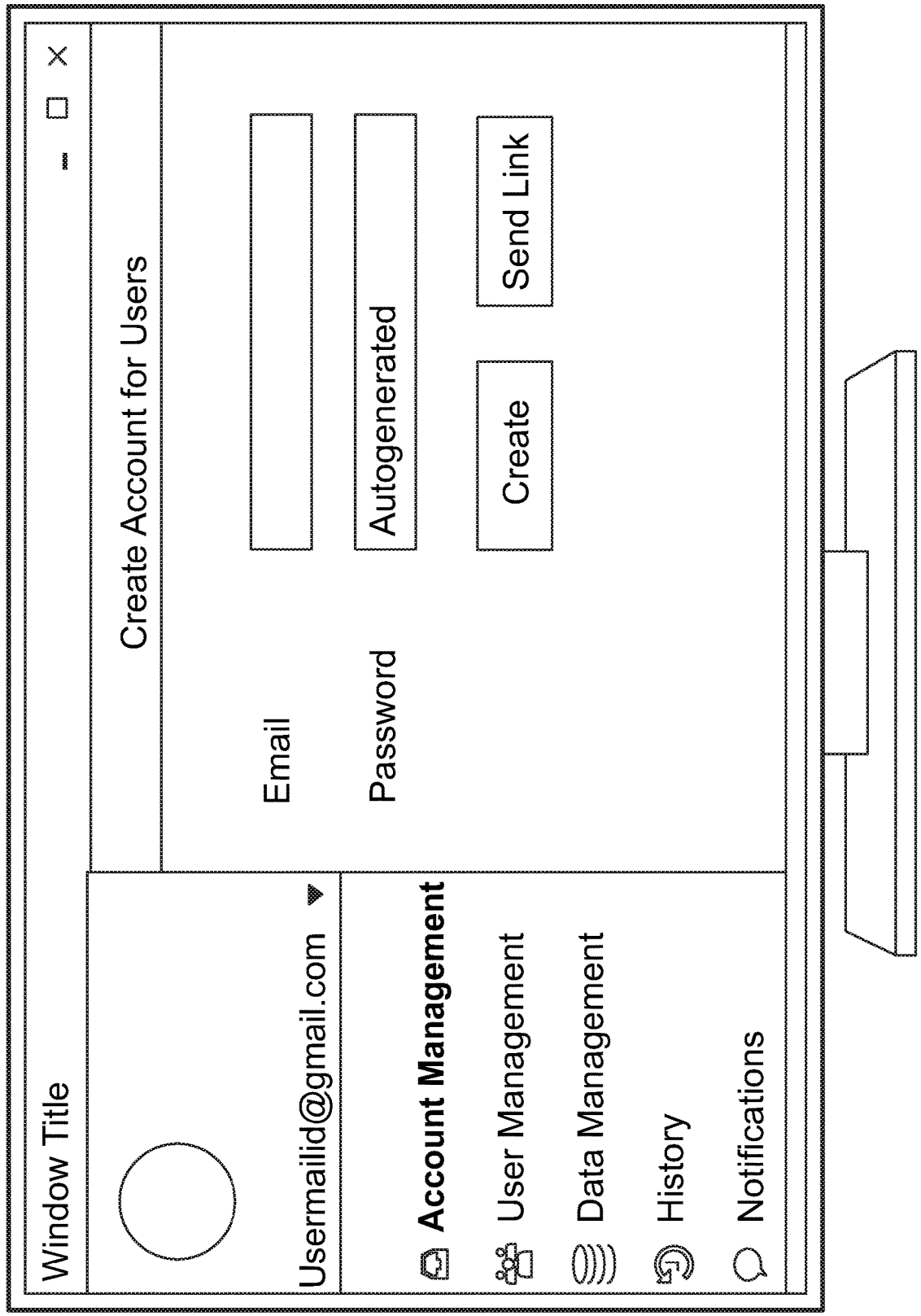
FIG. 6 depicts one embodiment of the mapping and coordinated communication system disclosed herein illustrating one potential screenshot of a computer based program as enabled, namely, one embodiment of a log in screen where a user would enable access.
Figure 7:
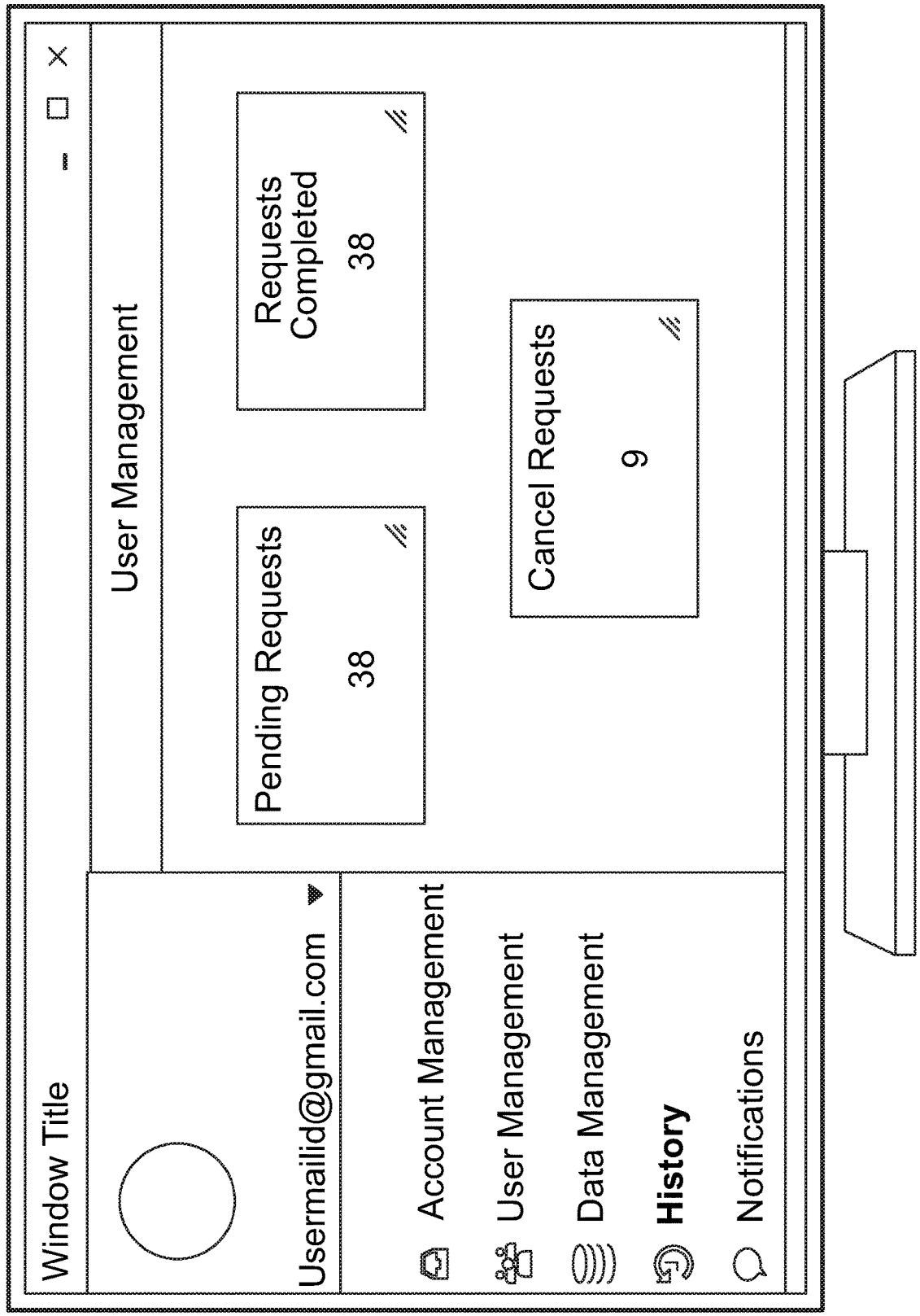
FIG. 7 depicts one embodiment of the mapping and coordinated communication system disclosed herein illustrating one potential screenshot of a computer based program as enabled, namely, one embodiment of a user management screen where a user would manage an account and facilitate information entry and viewing.
Figure 9:
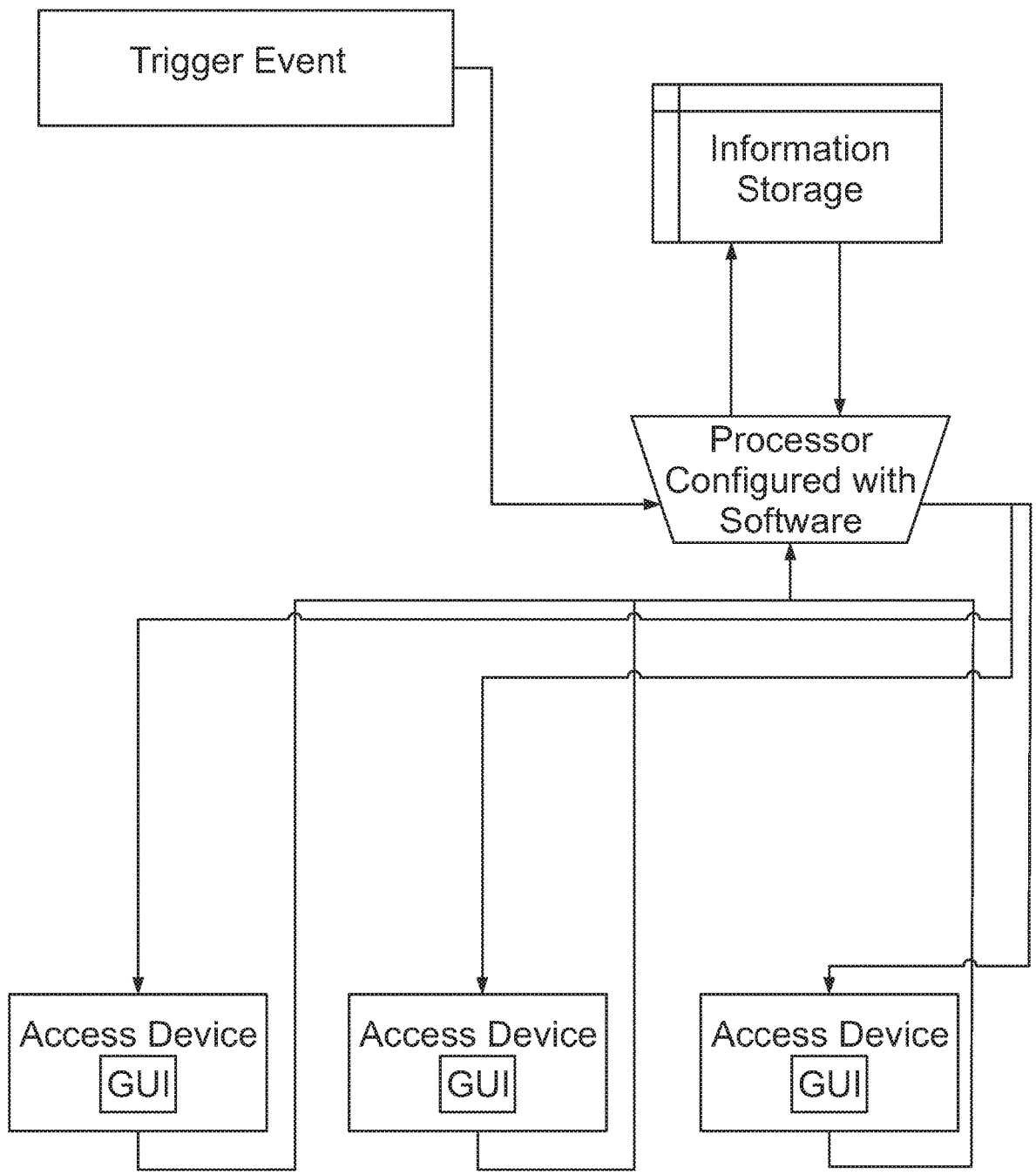
FIG. 9 depicts one embodiment of the mapping and coordinated communication system disclosed herein illustrating the basic components, namely, a processing device configured with software and algorithms to process all information and deliver output, an information storage device and a plurality of access devices configured with a GUI, each bilaterally communicatively linked and the processing device configured to be able to receive information regarding a trigger event, and showing the flow and storage of information.

For clarity of disclosure, and not by way of limitation, the detailed description of the invention is divided into the following subsections that describe or illustrate certain features, embodiments or applications of the present invention.

Definitions

"event" as used herein means an emergency requiring a first responder and in some cases successive responders to respond to the emergency with specialized equipment to lend assistance to reduce damage and/or reduce life threatening circumstances. By way of example and not limitation, an event may be a fire that needs a fire response vehicle to come, hook up to a hydrant, and fight the fire.

"event location" as used herein means the specific GPS coordinates and/or common street address where the event is taking place. An event location may be as large as required to effectively describe all areas where an event is taking place and/or as pinpointed as known to a specific area within a single address.

"trigger event" as used herein means a specific event that prompts the mapping and coordinated communication system disclosed herein to enter into an active mode to provide specific output to end users through their end user access devices.

"GPS" as used herein means a commonly known global positioning system and coordinates commonly used to locate specific areas, addresses, objects and other things typically pinpointed on maps utilizing such systems.

"responder" as used herein refers to any person, vehicle, combination thereof, or other element where such person, vehicle, combination thereof, or other element lends assistance to a coordinated effort to respond to an event and provide assistance at an event location to help alleviate any element of an event and reduce potential damages resulting from an event.

"access device" as used herein means any device configured with a graphical user interface allowing an end user to access the mapping and coordinated communication system disclosed herein, receive specific output and/or input information.

"specific output" as used herein means particular information analyzed, processed, and/or outputted by the mapping and coordinated communication system disclosed herein and routed to one or a plurality of access devices.

The System and Method of the Present Invention

In one embodiment, the mapping and coordinated communication system disclosed herein comprises a computer storage drive preconfigured with detailed information. Such information may include detailed street maps configured to receive real-time traffic and/or construction and/or other traffic flow influencing information, locations of fire hydrants, buildings, kiosks, subway entrances, bus stops, and the like, and other information about the surrounding areas, such as alternate side of the street parking regulations and schedules, weather, both current and forecasted, aerial photographs, and other information that may provide details about a particular location in real-time. In another embodiment, any or all such information may be updated regularly and/or continuously and/or capable of updating via direct input by a user of an access device.

In one embodiment, the mapping and coordinated communication system disclosed herein further comprises software configured to analyze all detailed information stored and provide specific output in response to a trigger event to any number of users of access devices.

In one embodiment, the mapping and coordinated communication system disclosed herein further comprises software configured to engage with third party applications for the purpose of gaining updated and/or real time data pertaining to any data in storage or any data desired to provide a better analysis and coordination of responder efforts. For example, and without limitation, the system could coordinate with Google Maps® and provide all information and implement all functionality of such third party application directly within the system described here.

In one embodiment, the software of the mapping and coordinated communication system disclosed herein is configured to respond to a trigger event by immediately pinpointing with as much accuracy as possible within its stored mapping information and/or through integrated third party applications, the event location. The software would also be configured to begin locating the nearest fire hydrant and the successively next nearest fire hydrants and begin assessing the status of each. Assessment of the status of each includes, without limitation, assessing factors such as which side of the street the hydrant is located, when the last known functionality test was performed, whether the hydrant is likely to be blocked by obstructions such as garbage or snow based on garbage day information and recent weather, whether the street is one-way and which direction a responding vehicle would be directed to approach, and the like. The software would also be configured to assess the status and location of the nearest firehouse and responding vehicles, and successively the status and location of the next nearest firehouse and responding vehicles, and whether any response vehicles in those locations are already dispatched somewhere else. The software would also be configured to begin assembling a response plan based on the known information, including but not limited to, the reported size and complexity of the event, the location and status of potential response vehicles, what the probability is of needing to have response vehicles at the ready for other potential events, location of fire hydrants and other event location resources, traffic and traffic flow impediments, mapping information and any other relevant information in a given circumstance.

In one embodiment, the software of the mapping and coordinated communication system disclosed herein is further configured to provide specific output to specific access devices to set the response plan in motion. In this manner, one specific output may direct a specific response vehicle to proceed to the event location via a specific route and arrive in front of a specific fire hydrant and hookup via the access device of a specific user related to that specific response vehicle. The fire hydrant that first specific output directed that specific response vehicle to arrive in front of may or may not be the one that the response vehicle team members may have chosen in the absence of the software of the mapping and coordinated communication system disclosed herein. For example, this vehicle may be the first to arrive and may have simply hooked up to the first hydrant it came across arriving on scene. But, that may not be the best hydrant for a number of reasons. There may be a closer hydrant past the address, but in the stress of the moment, a response vehicle will not want to take a chance that a closer hydrant is further on, because, if they are wrong, they will have to back up or turn around and precious seconds are lost. Alternatively, even though they are the first to arrive, there may be a second response vehicle arriving within seconds or a minute with greater capacity than the first responding vehicle and the closest hydrant may be best utilized by that second arriving vehicle where the first arriving vehicle is directed to the second closest hydrant—something that would be unable to happen without the specific output provided by the mapping and coordinated communication system disclosed herein.

In one embodiment, the mapping and coordinated communication system disclosed herein further comprises information about street numbers, odd and even, and number limits for each block.

In one embodiment, the mapping and coordinated communication system disclosed herein further comprises actual street view pictures of buildings and other event location structures such that when a desired resource is obstructed, the specific output may include street view photographs so that users can pinpoint where a resource is located and remove any obstruction with efficiency. In this embodiment, the mapping and coordinated communication system may further comprise actual pictures of the event location so that responders can identify the building with ease, identify obstacles or other impediments to responding efficiently and plan accordingly before arrival at the event location. For example, knowing things like the locations of wires, trees, fire escapes, windows, what type of building construction, and the like, will enable the responders to not only efficiently arrive at the event location, but also not waste valuable time planning the response once on location.

In one embodiment, the mapping and coordinated communication system disclosed herein further comprises sensors mounted to each individual fire hydrant or other needed resource such that specific output is generated with real time status of that resource. For example, a sensor will detect when a responding vehicle has hooked up to a specific hydrant and from that point, specific output would always direct successive responding vehicles to alternative resources or hydrants, even in the situation where a responding vehicle mistakenly hooks up to a resource or hydrant that was earmarked for a different responding vehicle. Thus, even mistakes are accounted for and minimized.

In one embodiment, the mapping and coordinated communication system disclosed herein further comprises a direct communication functionality between responding vehicles so that immediate knowledge of until that point surprise or unfolding circumstances is now communicated to the collective of all responders and all responders can function as a coordinated unit.

In one embodiment, the mapping and coordinated communication system disclosed herein further comprises various types of access devices, some being smartphones, some being tablets, some being proprietary integrated specific devices configured to be access devices, some may be installed into a dashboard of a response vehicle and some may be desktop computers that remain at a firehouse or other central control office. In this embodiment, flexibility is provided. Needed specific output is put into the hands of any responder at any moment with complete mobility while other or all specific output can be monitored and assessed by an overseer responder, updating with inputted information as necessary.

In one embodiment, the mapping and coordinated communication system disclosed herein further comprises a non-event response module for maintenance purposes. For example, those responsible for maintenance of resources (a fire department, a department of environment, etc.) may have access to both input maintenance information when performed and be alerted to when certain resources are not operational or not at peak efficiency. For example, if it is determined that a hydrant needs repair, that information can be sent to the appropriate place to have that taken care of.

Examples

The present invention is further illustrated, but not limited by, the following examples.

In one embodiment, the mapping and coordinated communication system is a tool for generating a most efficient response plan to an event in immediate response to a trigger event and displaying various components of that plan via specific output to the specific user of a specific access device who is to carry out that specific portion of the overall plan.

In this embodiment, not all responders need to know all information and all parts of the overall response plan. In fact, being inundated with too much information could have the tendency to slow down the individual performers and actually have an overall negative effect on the efficiency of the event response effort. Thus, it is an important facet of some embodiments of the mapping and coordinated communication system disclosed herein that the system is configured to parse specific output and have the ability to provide certain specific output to certain specific access devices based upon a determination of need to know for certain users of particular access devices while allowing any user access to all specific output upon request.

In one embodiment, the mapping and coordinated communication system disclosed herein may require user login credentials for a user to access an access device. In this embodiment, the login provides protections from the system being compromised by the unscrupulous input of false information and also provides the system with important identification information about the user of a particular access device allowing the system to provide that user particular specific output.

In one embodiment, the mapping and coordinated communication system disclosed herein may require certain inputted information to be confirmed before reliance thereon in formulating or updating any overall response plan or outputting any specific output.

In one embodiment, the mapping and coordinated communication system disclosed herein is configured to provide specific output and develop an overall response plan for any number of events and is especially useful where multiple events occur in a relatively small geographic area that would tax the abilities of first and successive responders by providing the most appropriate allocation of resources and in some instances, diverting resources already present at one event to an alternate event more in need of resources.

In one embodiment, a user may override a directive or specific output provided to that user. For example, a user upon receiving instructions to arrive at an emergency scene and hook up to a specific hydrant, for whatever reason, may override and input that they will be hooking up to a different hydrant. The system would then update, re-routing all other responders accordingly knowing that that specific user would be hooking up to a specific hydrant.

In one embodiment, the system could locate any number of 'nearest' hydrants, with 'nearest' having alternative definitions, i.e., nearest as the crow flies, nearest on the same street or nearest within the same or cross streets. In a preferred embodiment, the system would provide the five nearest hydrants. In one embodiment, the system will also provide the exact distance of each located hydrant from the emergency location, along with all data about each such hydrant, such as last service, last know working status, drain, accessibility; output capacity and the like.

In one embodiment, the system will produce a link to an actual street view of both any hydrant and the emergency location, as well as an aerial view, so that a responder may view the area before actual arrival and save precious seconds once arrived. The scene will have already been surveyed. Turn by turn navigation can be provided. Obstacles can be seen prior to arrival, such as overhead wires, tree limbs, fire escape locations, parked cars, bicycles, and other obstructions. The presence of window bars can be determined ahead of time. Property setbacks can be seen as well as open and/or closed shafts on the roof.

In one embodiment, the fire hydrants can be represented within the system mapping display as beacons, easily pointing out in relation to the emergency location and all other elements, where exactly all hydrant locations are.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. An event information and communication system comprising:
  an information storage device configured to store information and containing stored information regarding an event and event location;
  a processing device communicatively linked to said information storage device and a plurality of access devices;
  software for use on said processing device wherein said software is configured to provide instructions to enable said information storage device to store and allow access to information on said information storage device and further configured to provide data analysis and specific output to said access devices in response to a trigger event and further configured to provide updated specific output in real time as said trigger event and circumstances surrounding said trigger event are updated in real time wherein said real time updates regarding said trigger event and circumstances surrounding said trigger event are provided from sources of information from the group of sources of: other system users, links to automatic information sensors, and dispatch information inputters; and further wherein said specific output and updated specific output minimally includes specific instructions unique to each specific output display associated with a user;

wherein said information stored on said storage device minimally includes data in connection with an at least one relevant fire hydrant including location, surrounding area physical appearance, water flow, distances from various target points, and then current water pressure, then current obstructions, if any, and trigger event building attributes;

a graphical user interface configured on each of said plurality of access devices configured to allow any number of end users to access said processing device and receive said specific output and said updated specific output and further configured to allow a user of a specific access device to input information configured to be received by said processing device;

wherein said software is further configured to provide specific output regarding routes to be taken by users of certain particular access devices dependent upon the specific end user using a specific access device; and a display for each access device readable by an end user wherein said display is specific to each access device for each said user and minimally provides continuously updated, concurrently provided, real-time information specific to each specific user of the preferred hydrant that user is to hook up with, if any, and user selectable video feed views of the area that user will traverse in the path to arrival and the scene at arrival.

2. The event information and communication system of claim 1, wherein said software is configured to provide data analysis and specific output in response to a plurality of trigger events simultaneously.

3. A method of using the information and communication system of claim 1 wherein a trigger event is received at said processing device;

said processor configured with software performs data analysis and formulates a response plan and generates any number of required specific outputs specific to any number of particular end users of particular access devices;

said processor configured with software transmits specific output particular to certain access devices capable of being received by a user of those particular access devices;

a user of an access device, through the graphical user interface and display of that access device receives specific output detailing instructions for that user to follow in order to implement the response plan;

the user of a particular access device implementing his or her part of the response plan according to the specific output received;

the user of a particular access device communicating where necessary, through the graphical user interface of his or her access to device with the processor to update information;

the processor receiving updated information and updating the response plan and repeating the analysis of information and preparing updated specific outputting and transmitting same to particular end users where differences exist from what was previously transmitted.

4. The method of using the information and communication system of claim 3, wherein a plurality of trigger events is received at said processing device.

* * * * *